Patented June 21, 1927.

1,633,347

UNITED STATES PATENT OFFICE.

WILLIAM J. O'BRIEN, OF BALTIMORE, MARYLAND.

PROCESS OF REFINING BARYTES.

No Drawing. Application filed September 17, 1925. Serial No. 57,023.

This invention relates to a process of refining barytes and has special reference to the treatment of barytes to improve its qualities as a pigment.

In carrying out my process, the barytes ore, of a suitable degree of purity, is ground to about 200 mesh and then added to strong sulphuric acid and slurried. Into this mixture there is introduced $SO^3$, and substantially all of the barytes is dissolved. The mixture now consists of dissolved $BaSO_4$, sulphuric acid saturated with $SO_3$ (fuming sulphuric acid) and a suspension of the insoluble products of the ore (compounds of silicon, iron and other impurities occurring in the barytes ore). Some of the $BaSO_4$ may, under certain conditions, remain undissolved. This operation may be carried on at atmospheric pressure, using lower temperatures. However, it may be desirable, under certain conditions, to carry out this reaction at higher pressure and temperature owing to the greater solubility of the barytes ore under such conditions. Generally, no advantage is derived by using pressures greater than several atmospheres or 50 pounds per sq. in. or by heating above the fuming point of the sulphuric acid at the particular pressure. This operation is preferably carried on in a closed container.

The above mixture is allowed to stand until the suspended material settles, and the solution is drawn off into another container. This clear solution is now heated at about 60–70° C., whereby the greater portion of the $SO_3$ is expelled and the $BaSO_4$ is precipitated. The precipitated $BaSO_4$, which exists as sludge, is withdrawn from the bottom of the container and as much as possible of the strong acid is removed from this $BaSO_4$ sludge by filtration or other suitable means. The $BaSO_4$ is then washed with water and in the final washing is neutralized with a suitable base, for example the hydroxide of an alkali metal or alkaline earth metal, such as lime. The material is then filter-pressed, dried, milled to the proper size and then packed in suitable containers for sale.

The original residue containing undissolved barytes, compounds of silicon, iron and other impurities of the ore in the form of a sludge is drawn off from the bottom of the reacting chamber and the sulphuric acid recovered by suitable means. The residue may be either rejected or treated to form by-products, such as pigments or fillers.

The barium sulphate produced by my new process possesses a high degree of whiteness and superior capacity and covering power which render the product particularly valuable as a high-grade pigment.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of refining barytes, treating barytes ore with fuming sulphuric acid and then reprecipitating the dissolved $BaSO_4$ by volatilizing the excess $SO_3$ from the solution.

2. In a process of refining barytes, treating barytes ore with fuming sulphuric acid, separating the solution carrying the dissolved $BaSO_4$ from the undissolved materials of the ore and then precipitating the $BaSO_4$ by heating the solution and volatilizing the $SO_3$.

3. In a process of refining barytes, treating finely ground barytes ore with fuming sulphuric acid, separating the solution carrying the dissolved $BaSO_4$ from the undissolved materials of the ore and then evolving the $SO_3$ and precipitating the $BaSO_4$ from the solution by heating the solution at 60–70° C.

4. In a process of refining barytes, treating finely ground barytes ore with fuming sulphuric acid, separating the solution carrying the dissolved $BaSO_4$ from the undissolved materials of the ore, then evolving the $SO_3$ and precipitating the $BaSO_4$ by heating the solution, separating the $BaSO_4$ from the acid liquor and then washing the $BaSO_4$.

5. In a process of refining barytes, introducing finely ground barytes ore into concentrated sulphuric acid, agitating the mixture, passing $SO_3$ into the mixture and effecting solution of the $BaSO_4$, separating the solution carrying the dissolved $BaSO_4$ from the undissolved materials of the ore, volatilizing the $SO_3$ and precipitating the $BaSO_4$ from the solution by heating the solution, separating the BaSO$_4$ from the acid liquor and then washing the BaSO$_4$.

6. In a process of refining barytes, treating barytes ore with fuming sulphuric acid under pressure and then reprecipitating the dissolved BaSO$_4$ by volatilizing the excess SO$_3$ from the solution.

7. In a process of refining barytes, treating barytes ore with fuming sulphuric acid under pressures up to several atmospheres and then reprecipitating the dissolved BaSO$_4$ by volatilizing the excess SO$_3$ from the solution.

8. In a process of refining barytes, treating barytes ore with fuming sulphuric acid and heating in a closed vessel at temperatures not exceeding the fuming point of sulphuric acid and then reprecipitating the dissolved BaSO$_4$ by volatilizing the excess SO$_3$ from the solution.

9. In a process of refining barytes, treating finely ground barytes ore with fuming sulphuric acid under pressure, separating the solution carrying the dissolved BaSO$_4$ from the undissolved materials of the ore, then evolving the SO$_3$ and precipitating the BaSO$_4$ by heating the solution, separating the BaSO$_4$ from the acid liquor and then washing the BaSO$_4$.

10. In a process of refining barytes, introducing finely ground barytes ore into concentrated sulphuric acid, agitating the mixture, passing SO$_3$ into the mixture and effecting solution of the BaSO$_4$ while the mass is heated under pressure, separating the solution carrying the dissolved BaSO$_4$ from the undissolved materials of the ore, volatilizing the SO$_3$ and precipitating the BaSO$_4$ from the solution by heating the solution, separating the BaSO$_4$ from the acid liquor and then washing the BaSO$_4$.

In testimony whereof I affix my signature.

WILLIAM J. O'BRIEN.